(12) United States Patent
Park

(10) Patent No.: US 8,360,393 B2
(45) Date of Patent: Jan. 29, 2013

(54) VALVE ACTUATOR HAVING SPRING RETURN POWER

(75) Inventor: Soon-won Park, Seoul (KR)

(73) Assignee: Eunha Machinery Industrial Co., Ltd. (KR)

( * ) Notice: Subject to any disclaimer, the term of this patent is extended or adjusted under 35 U.S.C. 154(b) by 520 days.

(21) Appl. No.: 12/440,403

(22) PCT Filed: Feb. 23, 2007

(86) PCT No.: PCT/KR2007/000949
§ 371 (c)(1),
(2), (4) Date: Apr. 13, 2010

(87) PCT Pub. No.: WO2008/029977
PCT Pub. Date: Mar. 13, 2008

(65) Prior Publication Data
US 2011/0049407 A1    Mar. 3, 2011

(30) Foreign Application Priority Data

Sep. 7, 2006    (KR) .................... 10-2006-0085977

(51) Int. Cl.
*F16K 31/02* (2006.01)
*F16K 31/44* (2006.01)
*F16H 3/72* (2006.01)
*F16H 37/06* (2006.01)

(52) U.S. Cl. ........... 251/129.03; 251/129.12; 251/249.5; 251/71; 475/4; 475/7; 74/724

(58) Field of Classification Search ............. 251/68, 251/69, 70, 71, 129.03, 129.11, 129.12, 129.13, 251/248, 249.5, 250.5; 74/63
See application file for complete search history.

(56) References Cited

U.S. PATENT DOCUMENTS

| | | | | |
|---|---|---|---|---|
| 4,346,728 A | * | 8/1982 | Sulzer | 137/243.6 |
| 4,616,528 A | * | 10/1986 | Malinski et al. | 475/4 |
| 4,741,508 A | * | 5/1988 | Fukamachi | 251/71 |
| 4,760,989 A | * | 8/1988 | Elliott et al. | 251/129.03 |
| 4,896,562 A | * | 1/1990 | Wilkinson et al. | 475/3 |
| 5,986,369 A | * | 11/1999 | Hanley et al. | 310/77 |
| 6,254,058 B1 | * | 7/2001 | Keller | 251/69 |
| 6,981,428 B2 | * | 1/2006 | Donald et al. | 74/89.26 |

\* cited by examiner

*Primary Examiner* — John K Fristoe, Jr.
*Assistant Examiner* — Frederick D Soski
(74) *Attorney, Agent, or Firm* — Brinks Hofer Gilson & Lione

(57) ABSTRACT

A spring return valve comprising a motor, a first worm member, a second planetary gear member, a second worm member, an elastic member, and a valve attached to said second worm wheel is provided. Since the first and the second planetary gear are installed between the first worm shaft and the second worm shaft and the elastic member is fitted onto the second worm shaft, the load applied on the output shaft can be reduced a lot, the opening and/or closing operation is very easy even if the elastic coefficient is small, thereby the reduction in size is possible.

14 Claims, 5 Drawing Sheets

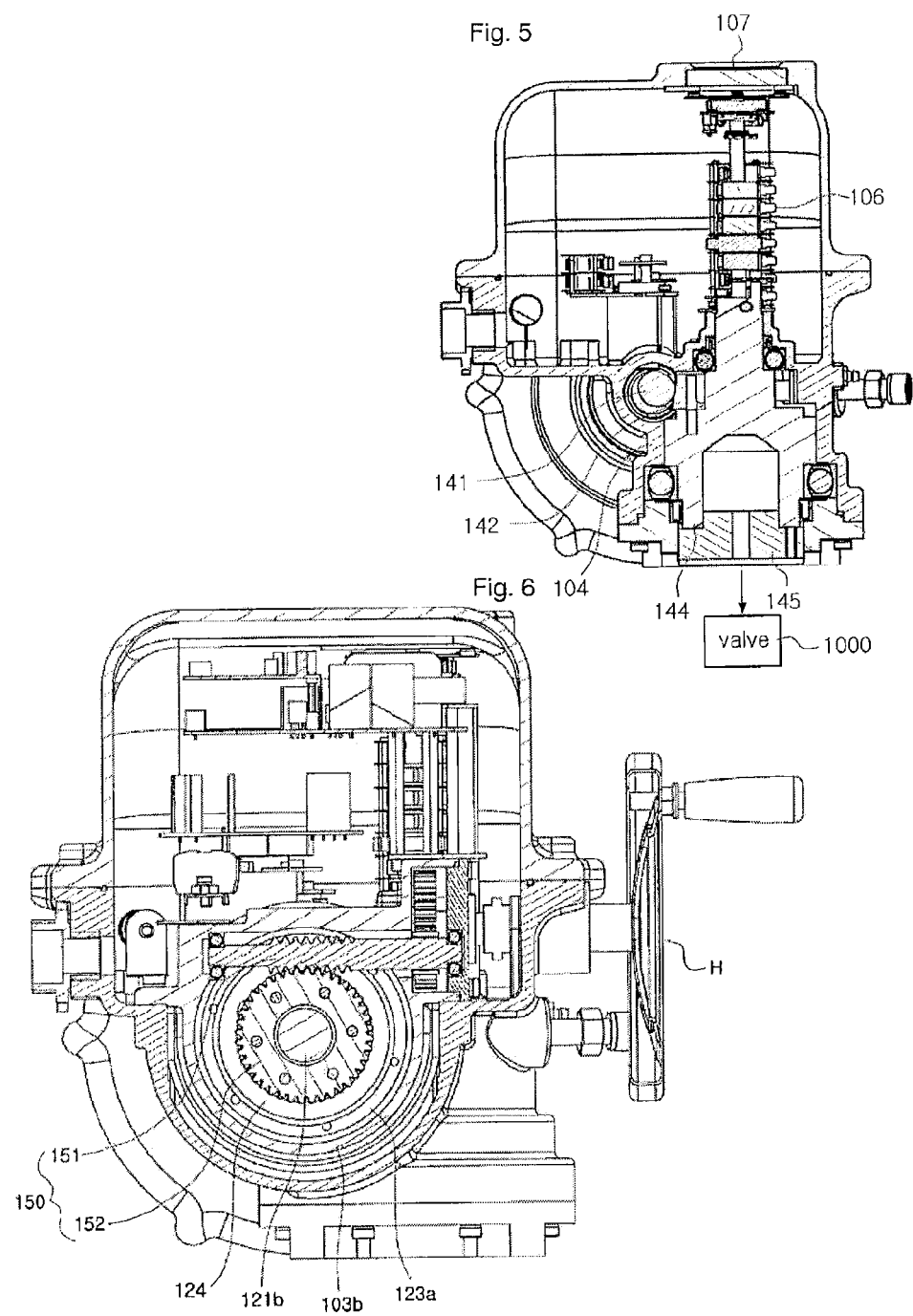

Fig. 7
(A) 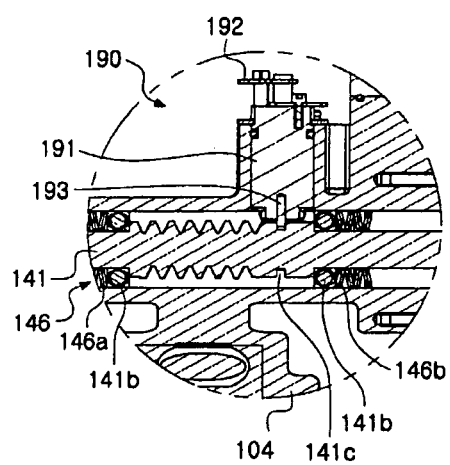
(B) 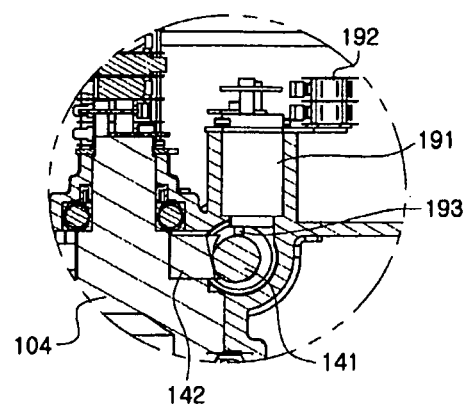

VALVE ACTUATOR HAVING SPRING RETURN POWER

RELATED APPLICATIONS

The present patent document is a §371 filing based on PCT Application Serial No. PCT/KR2007/000949, filed Feb. 23, 2007 (and published as WO 2008/029977 A1 on Mar. 13, 2008), designating the United States and published in English which claims the benefit of the filing date under 35 U.S.C. §119(a) of Korean Patent Application No. KR2006-0085977, filed Sep. 7, 2006. All of the foregoing applications are hereby incorporated by reference in their entirety.

TECHNICAL FIELD

This invention is related with a valve actuator, more specifically with a valve actuator that can open/close a valve with relatively small load at the time of shutoff.

BACKGROUND ART

A valve actuator is designed to open/close a valve at the time of emergency. For example, when power is shutoff due to the fire etc., the valve actuator opens the valve, whereby air vent at the facility is opened. Also, when an accident happens in a ship or chemical industry facility, the valve should be closed automatically in order to avoid a collision or hazardous gas.

There are two types of valve actuator. One is pneumatic type actuator operated by compressed air; the other is motor driving type actuator operated by electricity. In case of pneumatic type actuator, the preparation of compressed air is indispensable. Therefore, motor driving type actuator is easier to use and more usual type. The motor driving type valve actuator is driven by emergency power or by the driving force of an elastic member to shutoff a valve at the time of emergency. Generally, using the driving force of an elastic member, e.g. a spring, especially a coil spring, on cite is more common than using the emergency power driving.

A conventional spring return valve actuator has very simple structure, in case of small type, comprising a motor, a worm member connected thereto, and a planetary gear member. A valve is connected to a sun gear shaft (final output shaft) of the planetary gear, and an elastic member is fitted between the sun gear shaft and the valve. On the other hand, more complicated structure is applied to a large type spring return valve actuator. The large type actuator comprises a first worm member, a second worm member and two planetary gear connected to the second worm member, and an elastic member is fitted onto the final output shaft. In this spring return valve actuator, the driving force of the motor is transmitted from the first worm member to the second worm member, and to the first planetary member, then the second planetary member in this order, whereby the valve arranged on the second planetary member is opened/closed normally. On the other hand, at the time of emergency, e.g. power shutoff, a brake which connect to the first worm member is released, and the valve is opened/closed by the force of the elastic member which is fitted onto the final output shaft (second sun gear shaft).

However, the conventional spring return valve actuator has some defects such that an elastic member having large elastic coefficient and tensile force should be used in order to drive the valve directly since both of the elastic member and the valve are fitted onto the final output shaft together, that the lifetime of the valve actuator is not as long since a large load will be applied on the output shaft, and that the volume of the valve actuator is large.

DISCLOSURE OF INVENTION

Technical Problem

The object of this invention is to solve the problem of the conventional art, and provide a spring return valve actuator which can exert sufficient driving force to open/close the valve with an elastic member having relatively small elastic coefficient at the time of emergency by decreasing the load applied on the final output shaft to which the valve is fitted.

Technical Solution

The other object of this invention is to provide a spring return valve actuator which occupies relatively smaller volume than the conventional actuator by changing the location of the elastic member connected to the final output shaft.

In order to accomplish the above object, according to the present invention, a gear combination composed of first and second planetary gear is fitted between a first worm shaft and a second worm shaft to manually operating the same at the time of power shutoff, and an elastic member is fitted onto the second worm shaft with the gear combination in a spring return valve actuator.

Specifically, the spring return valve actuator according to the present invention comprises: a motor; a first worm member comprising a first shaft connected to said motor to transmit power and a first worm wheel connected vertically to said first worm shaft; a first planetary gear member attached to a brake member in connection with said first worm wheel; a second planetary gear member connected to said first planetary gear member and located on the opposite position of said brake member; a second worm member comprising a second worm shaft which is in shaft connection with said second planetary gear member and a second worm wheel which is gear-connected vertically to said second worm shaft; an elastic member attached onto the shaft extending from said second worm shaft to the opposite side of said second planetary gear member; and a valve attached to said second worm wheel.

Preferably, said motor can rotates forwardly and reversely.

Preferably, the spring return valve actuator further comprises a handle worm member between said first planetary gear member and said second planetary gear member.

Preferably, in the spring return valve actuator, a first ring gear member comprising a first flange connected to said first worm wheel and a first ring gear connected to said first ring gear flange; a first planetary gear revolving around the inner gear face of said first ring gear; and a sun gear rotating and connected with said first planetary gear.

Preferably, in the spring return valve actuator, said second planetary gear member comprises a second sun gear shaft connected said first planetary gear member; a second sun gear member with a second gear connected with said second sun gear shaft; and a second ring gear member comprising a second planetary gear coupled to said second sun gear and revolving around the circumference thereof and a second ring gear connected with the second planetary gear.

Preferably, the spring return valve actuator further comprises a handle worm member, between said first planetary gear member and said second planetary gear member, comprising a handle worm shaft joined with a handle outside the main body and a handle worm wheel connected to said handle worm shaft and to said second planetary gear through a second planetary gear carrier.

Preferably, in the spring return valve actuator, said brake member comprises: a brake shaft and a clutch member attached to one end of said brake shaft, and a stopper is installed on said brake shaft.

Preferably, in the spring return valve actuator, a stopper wheel inserted into said brake shaft and having unevenness on circumference thereof; a stopper pin having a stopper elastic member on one end thereof; and a stopper lever which is hinge-connected with said stopper pin.

Preferably, in the spring return valve actuator, said elastic member is a coil spring.

And, in the spring return valve actuator, it is preferable that fixing members are installed on both sides of said second worm wheel to limit the scope of the rotation of said second worm wheel.

Preferably, in the spring return valve actuator, said second worm wheel is connected to an output shaft, and a connection member is provided on said output shaft, to which various valves can be fitted.

Preferably, in the spring return valve actuator, a buffer unit is provided at both sides of said second worm shaft to ease the movement along the axial direction of said second worm shaft.

Preferably, in the spring return valve actuator, an over torque switching unit is provided on said second worm shaft to prevent an over torque movement along the axial direction of said second worm shaft.

Preferably, said over torque switching unit comprises: a torque shaft rotatably connected on said second worm shaft almost vertically by a torque pin; and a rotation detecting sensor installed on said torque shaft to detect the rotation of the same.

Advantageous Effects

According to the present invention, since the first and the second planetary gear are installed between the first worm shaft and the second worm shaft and the elastic member is fitted onto the second worm shaft, the load applied on the output shaft can be reduced a lot, the opening and/or closing operation is very easy even if the elastic coefficient is small, thereby the reduction in size is possible.

Also, according to the present invention, the valve can be returned not only by the operation of the elastic member, but also by fixing the brake shaft with separate stopper member and rotating the outside handle.

BRIEF DESCRIPTION OF THE DRAWINGS

In the following the present invention is described in more detail, by way of example only, with reference to the attached drawings, in which

FIG. 5 is a side cross sectional view of the second worm member taken along the line E-E in FIG. 1.

FIG. 6 is a side cross sectional view of the handle worm member taken along the line F-F in FIG. 1.

FIGS. 7A and 7B are detailed drawings for the over torque switching unit in FIG. 1.

BEST MODE FOR CARRYING OUT THE INVENTION

Figure 1:
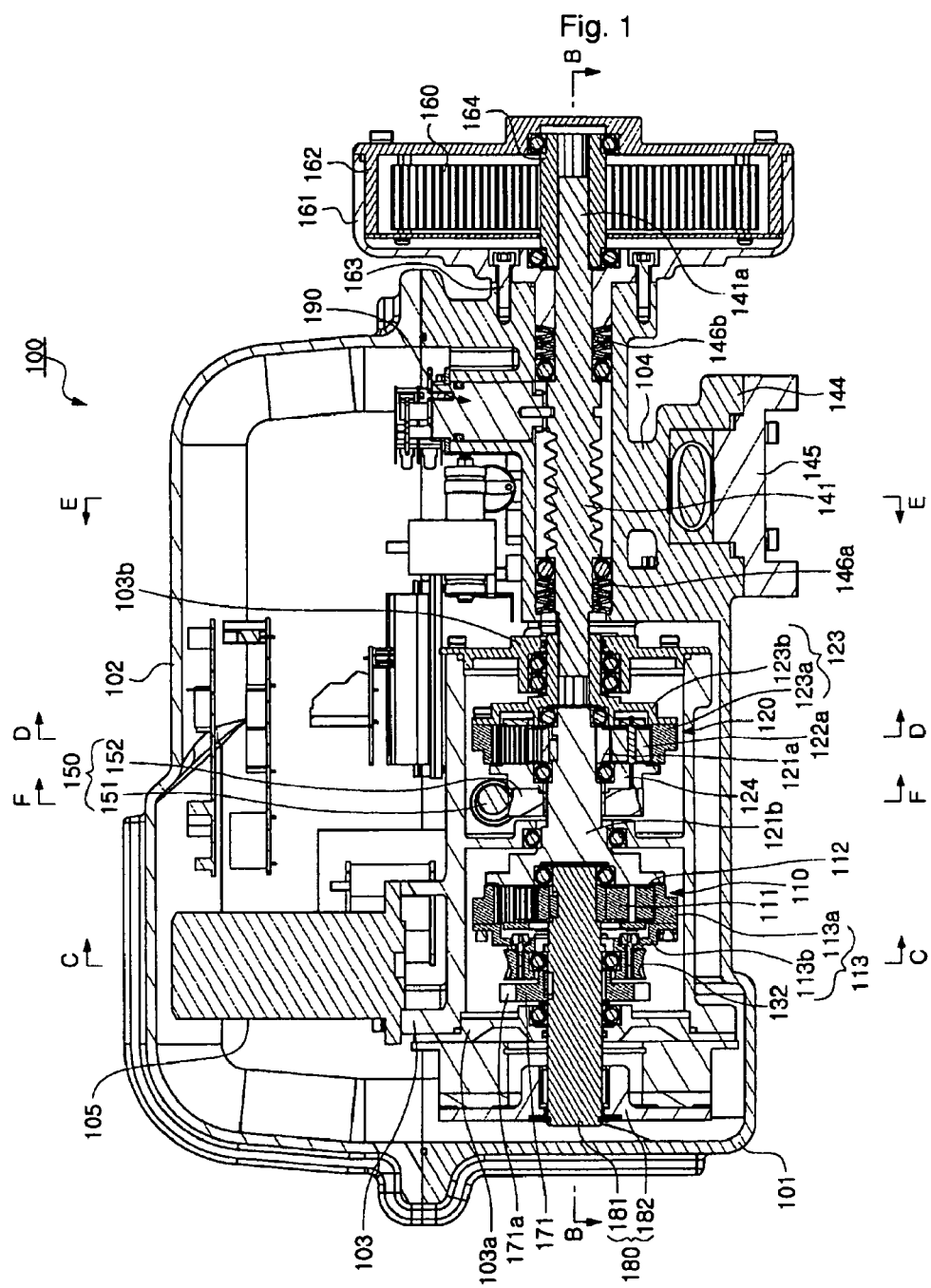
FIG. 1 is the internal cross sectional view of the spring return valve actuator according to the present invention.

FIG. 1 is the internal cross sectional view of the spring return valve actuator according to the present invention and FIGS. 2 to 6 are the cross sectional views along the line B-B, C-C, D-D, E-E and F-F in FIG. 1 respectively.

FIGS. 7A and 7B are detailed drawings for the over torque switching unit in FIG. 1, FIG. 7A is the front sectional view and 7B is the side sectional view.

Referring to FIG. 1 and FIG. 6, the spring return valve actuator 100 comprises motor 105, first worm member 130, second worm member 140, first planetary gear member 110 and second planetary gear member 120.

Said motor 105 is fixed on an internal frame 103 in main body 101, of which top is covered with top cover 102. The motor 105 can be installed outside the main body 101, but it is better in the main body 101. The motor 105 repeats forward rotation and reverse rotation. By repeating the forward rotation and reverse rotation, the valve actuator (not shown in the drawing) can be operated. The internal frame is covered with the first frame cover 103a and the second frame cover 103b. First planetary gear member 110, second planetary gear member 120 and first worm member 130 are installed within the space defined by the first and second frame cover 103a, 103b and the internal frame 103. A brake shaft 181 is rotatably supported on the center of the first frame cover 103a, and second worm shaft 141 is rotatably supported on the center of the second frame cover 103b respectively.

Figure 3:
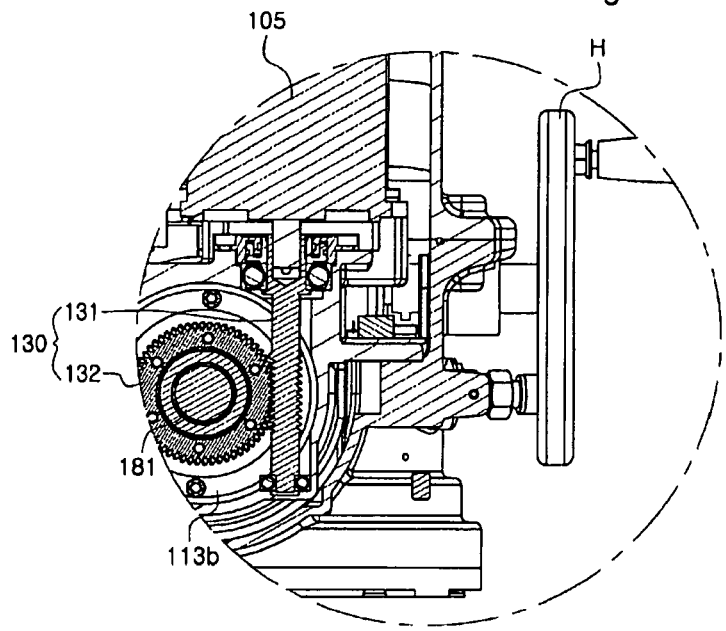
FIG. 3 is a detailed cross sectional view of the first worm member partially taken along the line C-C in FIG. 1.

The first worm member comprises first worm shaft 131 and first worm wheel 132. The first worm shaft 131 is joined on the driving shaft of the motor 105 and transmits the rotation of the motor to output. The first worm wheel 132 is in vertical gear connection with the first worm shaft 131. FIG. 3 shows the connection relationship between the first worm wheel 132 and the first worm shaft in detail.

The valve actuator according to the present invention comprises two pairs of planetary gear member 110, 120. The first and the second planetary gear member 110, 120 are facing each other. The first planetary gear member 110 is installed on the brake shaft 181 which the second planetary gear member 120 on the output shaft, i.e. the second worm member 140.

Basically, the first planetary gear member 110 comprises first ring gear member 113, first planetary gear 112 and first sun gear 111. The first ring gear member 113 comprises first ring gear flange 113b connected to the first worm wheel 132, and first ring gear 113a connected to the first ring gear flange 113 through connection means. The first planetary gears 112, preferably three, are located between the first ring gear 113 and the first sun gear 111 and are revolving around the first sun gear 111 along the inner face of the first ring gear 113a. The first sun gear 111 is connected with the brake shaft 181. The structure for the first planetary gear 110 as above is similar to the second planetary gear 120 shown in the FIG. 4.

The brake member 180 is composed of a brake shaft 181 and a clutch member 182. One end of the brake shaft 180 is supported on the main body 101, which the other end is inserted through the first sun gear 111 via the first frame cover 103a. The clutch member is installed on one end of the brake shaft 181. It is preferable that a stopper member 170 is installed around the brake shaft 181.

Figure 2:
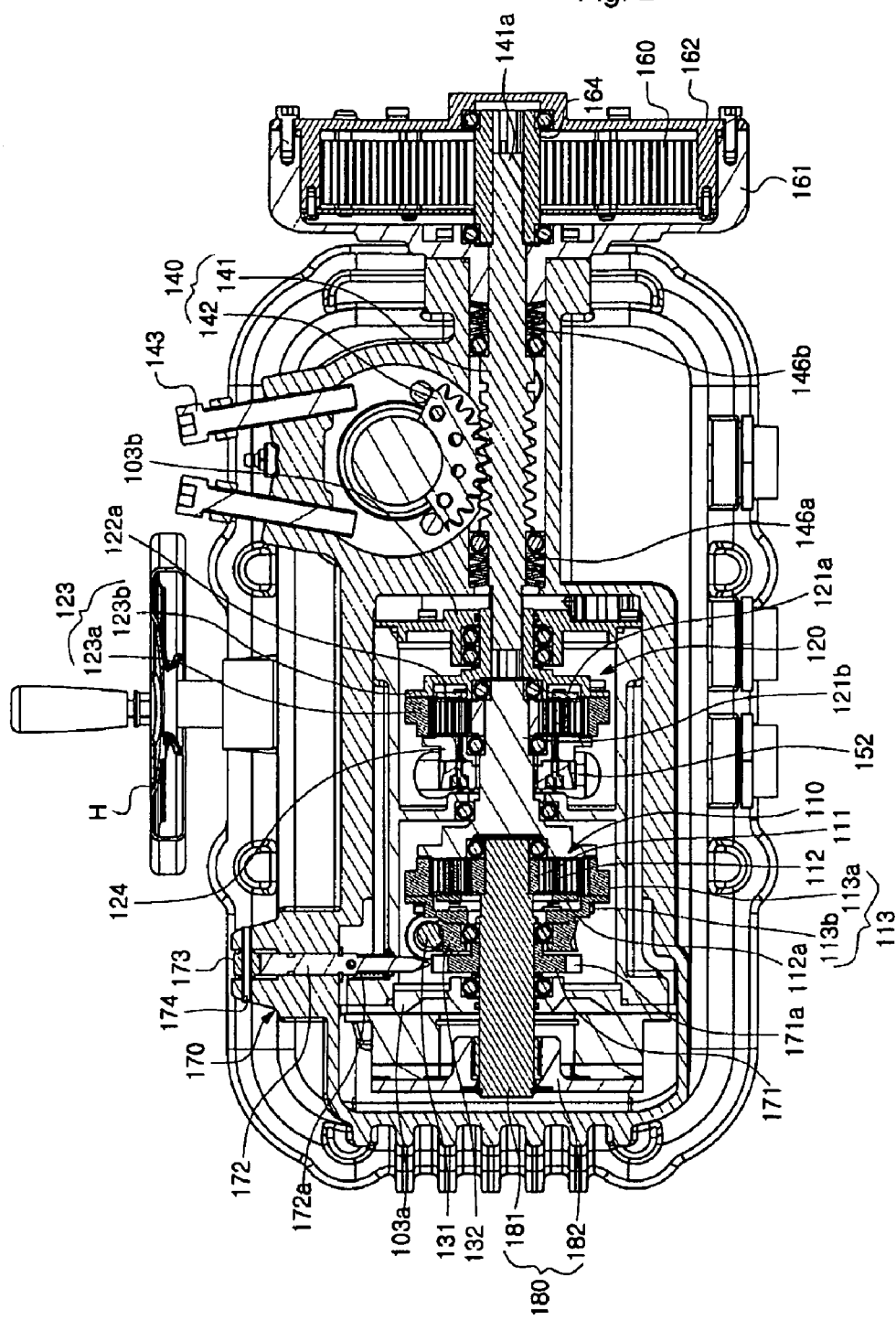
FIG. 2 is the cross sectional view along the line B-B in FIG. 1 seen from above.
Figure 4:
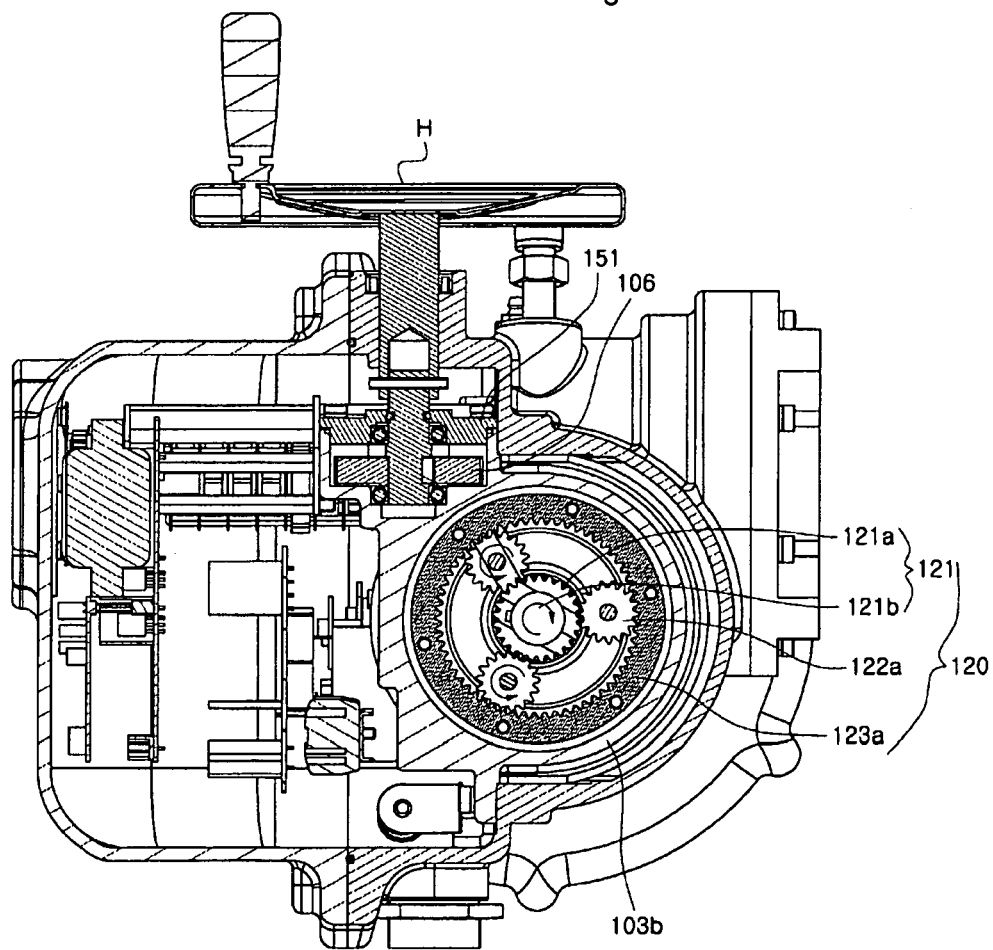
FIG. 4 is a side cross sectional view of the second planetary gear member taken along the line D-D in FIG. 1.

As shown in the FIGS. 1, 2 and 4, the second worm member 140 comprises the second worm wheel 142 and the second worm wheel like the first worm member 130. The second worm shaft 141 is rotatably supported on the center column 104 which constitutes the main body 101, and connected to the second ring gear shaft 123b vertically. The second worm wheel 142 is joined with the output shaft 144 in the center column 104 and rotates about the same. Unlike the conventional valve actuator, the spring return valve actuator according to the present invention is installed on the output shaft 144. It is preferable to provide a connection means 145, e.g. drive bushing, on the output shaft 144 in order to install various valve actuators.

The elastic member 160 is installed around the central shaft 164 connected to a shaft 141a extending from the second worm shaft to the opposite side of the second planetary gear member 120. In this embodiment, the elastic member is coil spring 160. The elastic member 160 is installed in the space defined by an elastic member housing 161 and a case 162. The housing 161 is installed on the side of the main body 101 by a connection member 163. The elastic member winds into one direction and unwinds to the other direction. Since elastic energy is stored in the wound state, it can drive the second worm shaft 141 to the opposite direction by the unwinding force at the emergency mode.

As shown in FIG. 1, FIGS. 7A and 7B, a buffer unit 146 is provided around both side of the second worm shaft 141. Preferably, the buffer unit 146 is a disc spring 146a installed beside a bearing 141b of the second worm shaft. The buffer unit can ease the axial movement of the second worm shaft due to the impact transmitted from the valve actuator. Also, the buffer unit 146 can regulate the length of the gear pitch of second worm when the second worm gear member is assembled.

According to the return valve actuator of the present invention, it is possible to prevent the second worm shaft 141 from moving due to overload by providing an over torque switching unit 190. The over torque switching unit 190 comprises a torque shaft 191 located vertically to the second worm shaft 141 and a rotation detecting sensor 192 installed on the torque shaft. The torque shaft 191 is joined with the second worm shaft 141 by inserting a torque pin 193 into a groove 141c thereon. Therefore, the torque shaft 191 can rotate when the second worm shaft 141 moves axially. Moreover, the rotation detecting sensor (192) detects the rotation of the torque shaft 191. The detected signal transmitted to the controller (not shown). The rotation detecting sensor 192 is, e.g. a limit switch.

As shown in the FIG. 2, it is preferable that a fixing member 143 is provided to limit the range of the opening/closing degree, e.g. about in 90 for the protection of the valve.

The spring return valve actuator further comprises a handle worm member 150 and a stopper member 170 between the first planetary gear member 110 and the second planetary gear member 120 in order to manually operate the same at the time of emergency.

As shown in the FIG. 6, the handle worm member 150 comprises a handle worm shaft 151 connected to the handle H outside of the main body 101 and a handle worm wheel 152 joined with the handle worm shaft 151. The handle worm wheel 152 is connected to the second planetary gear 122a through second planetary gear carrier 124. Since the second planetary gear carrier 124 is connected to the second planetary gear 122a through bearing at the second sun gear shaft, it can rotate independent from the second sun gear shaft 121b.

As shown in the FIG. 2, the stopper member 170 comprises a stopper wheel 171, stopper pin 172 and a stopper lever 173. The stopper wheel has unevenness 171a on circumference thereof and connected to the brake shaft 181. A stopper elastic member 172a, e.g. a spring is fitted on one end of the stopper pin 172, whereby the stopper pin 172 can be inserted into the unevenness 171a. The stopper lever 173 is hinge-connected 174 with the stopper pin 172.

The undefined reference 106 in the FIG. 5 is limit cam switch noticing the status of the valve rotation, and 107 is side glass.

Hereinafter, the operation of the above spring return valve actuator is described in detail.

The spring return valve actuator 100 according the present invention have 3 modes; Regular operation mode in which power is supplied, emergency operation mode at the time of power cutoff and manual operation mode.

First, in the regular operation mode in which power is supplied without any problem, motor 105 rotates. When the motor 105 rotates forward, the first worm shaft 131 rotates together, then the first worm wheel 132 joined with the first worm shaft 131 rotates. Since the first worm wheel is supported by the brake shaft 181 via bearing and connected to the first ring gear 113a by the first ring gear flange 113b, the driving force from the first worm wheel 132 is transmitted to the first ring gear 113a. Then, the driving force from the first ring gear transmitted to the first planetary gear 112, to the first sun gear 111, then to the brake shaft 181. At that time, since power is applied to the brake member 180 and the clutch member 182 brake the brake shaft 181, the electromagnetic brake shaft 181 cannot rotate. Therefore, the first sun gear is in static state, and the driving force from the first worm wheel 132 is transmitted to the second ring gear 123a via the first ring gear 113a.

Next, the driving force from the second ring gear transmitted to the second sun gear shaft 121b, to the second sun gear 121a, to the second planetary gear 122a, then to the second ring gear 123a. However, the driving force from the second planetary gear carrier 124 cannot drive the handle worm wheel 152 because of its structure when the second planetary gear member 120 is driven. Therefore, the second worm shaft 141 is driven with the second ring gear shaft 123b by the rotation of the second ring gear 123a, and the second worm wheel connected to the second worm shaft rotates. By the rotation of the second worm wheel 142, the valve (1000) which is attached to the final output shaft 144 via drive bushing 145 is closed, and the actuator is driven attached to the valve. Though the elastic member 160 installed on the extended shaft 141a of the second worm shaft 141a will be wound, the second worm shaft 141 will rotate forward against the winding force of the coil spring 160. However, the stopper wheel do not act as a brake in regular operation mode since the stopper pin 172 is away from the unevenness 171a of the stopper wheel 171.

On the other hand, when the motor rotate reversely, the first worm member 130, the first and the second planetary member 110, 120 and the second worm member 140 take wholly opposite action to the forward rotation, whereby the valve is opened. When the second worm shaft 142 rotate reversely, the elastic member 160 is released free and does not disturb the rotation of the second worm shaft 142. The rotating direction of the motor 105 and the opening/closing of the valve actuator can be changed Moreover, when the power is cutoff, the valve actuator automatically goes on to the emergency operation mode. At the emergency operation mode, since the motor 150 cannot rotate and the brake member 180 is not activated, the brake shaft 181 is released. Therefore, when the power is cutoff, the second worm wheel rotates in the opposite direction to the coil spring 160 is wound by the return force of the coil spring 160, at the same time the second worm wheel 142 also rotates reversely, whereby the valve connected to the output shaft 144 is opened. By the procedure as above, the valve attached to the valve actuator will be opened automatically, then the actuator closes air vent. Also, by changing the rotational direction and/or the operation of the valve opening/closing, the valve can be closed automatically in order to cutoff the collision or hazardous gas when an accident is happened on a ship or a chemical factory.

On the other hand, to manually operate the valve actuator according to the present invention when power is cutoff and the more 105 is stopped, an operator can use the handle H attached on a side of the main body 101. As shown in the FIGS. 2 and 6, first the operator manipulates the stopper lever 173, has the stopper pin 172 insert into the unevenness 171a of the stopper wheel, and fixes the stopper wheel 171, then fixes the brake shaft 181. In this situation, if the operator rotates the handle worm shaft 151 by the handle H, the handle worm wheel 152 attached to the handle worm shaft 151 is driven, the second planetary carrier 124, the second planetary gear 122a, the second ring gear 123a, the second ring gear shaft 123b, and the second worm shaft 141 is driven in this order. Therefore, the second worm wheel 142 connected to the second worm shaft 141 is driven, whereby the valve which is attached to the second worm wheel can be opened/closed manually. Since the valve actuator is provided with the fixing member 143, the opening/closing degree can be regulated in the manual operation mode.

Moreover, according to the spring return valve actuator of the present invention, since the over torque switching unit is installed on the second worm shaft 141, movement by overload applied to the second worm shaft 141 by the opening/closing of the valve or impact from outside can be prevented. For example, in case that the second worm shaft 141 moves along the axial direction by the opening/closing of the valve or the movement of the second worm wheel 142, the torque shaft 191 of the over torque switching unit rotates. The rotation detecting sensor 192 detects the rotation, and the detection signal stops the motor 105 or is transmitted to an outside controller (not shown). Therefore, the spring return valve actuator 100 can ease or prevent the impact applied to the second worm gear member, while the final output shaft maintains the worm gear structure.

As described in the above, according to the spring return valve actuator 100 of the present invention, the load applied to the final output shaft can be reduced by installing the elastic member 160 and the over torque switching unit 190 on the second worm shaft 141, whereby an elastic member having relative small elastic coefficient can be used. Therefore, it is easy to open/close the valve, and the size of the device can be reduced.

Even if the preferred embodiment is described above, a person in the art can understands that the present invention is not limited thereto but may vary in detail within the scope of the attached claims.

The invention claimed is:

1. A spring return valve actuator comprises:
    a motor;
    a first worm member comprising a first shaft connected to said motor to transmit power and a first worm wheel connected vertically to said first worm shaft;
    a first planetary gear member attached to a brake member in connection with said first worm wheel;
    a second planetary gear member connected to said first planetary gear member and located on the opposite position of said brake member;
    a second worm member comprising a second worm shaft which is in shaft connection with said second planetary gear member and a second worm wheel which is gear-connected vertically to said second worm shaft;
    an elastic member attached onto a shaft extending from said second worm shaft, with said second worm shaft located between said elastic member and said second planetary gear member; and,
    a valve attached to said second worm wheel.

2. The spring return valve actuator according to the claim 1, said motor can rotates forwardly and reversely.

3. The spring return valve actuator according to the claim 1, further comprises a handle worm member between said first planetary gear member and said second planetary gear member.

4. The spring return valve actuator according to the claim 1, said first planetary gear member comprises:
    a first ring gear member comprising a first flange connected to said first worm wheel and a first ring gear connected to said first ring gear flange;
    a first planetary gear revolving around the inner gear face of said first ring gear; and
    a sun first gear rotating and connected with said first planetary gear.

5. The spring return valve actuator according to the claim 1, said second planetary gear member comprises:
    a second sun gear member comprising a second sun gear shaft connected to said first planetary gear member and a second sun gear connected to said second sun gear shaft;
    a second planetary gear revolving around the circumferential face of said second sun gear; and
    a second ring gear member comprising a second ring gear to which said second planetary gear is coupled and revolving and a second ring gear shaft connected to said second ring gear as well as to said second worm shaft.

6. The spring return valve actuator according to the claim 1, further comprises:
    a handle worm member, between said first planetary gear member and said second planetary gear member, comprising a handle worm shaft joined with a handle outside a main body and a handle worm wheel connected to said handle worm shaft and to said second planetary gear through a second planetary gear carrier.

7. The spring return valve actuator according to the claim 1, said brake member comprises:
    a brake shaft and a clutch member attached to one end of said brake shaft, and a stopper member is installed on said brake shaft.

8. The spring return valve actuator according to the claim 7, said stopper member comprises:
    a stopper wheel inserted into said brake shaft and having unevenness on circumference thereof;
    a stopper pin having a stopper elastic member on one end thereof; and
    a stopper lever which is hinge-connected with said stopper pin.

9. The spring return valve actuator according to the claim 1, said elastic member is a coil spring.

10. The spring return valve according to the claim 1, fixing members are installed on both sides of said second worm wheel to limit the scope of the rotation of said second worm wheel.

11. The spring return valve actuator according to the claim 1, said second worm wheel is connected to an output shaft, and a connection member is provided on said output shaft, to which various valves can be fitted.

12. The spring return valve actuator according to the claim 1, a buffer unit is provided at both sides of said second worm shaft to ease the movement along the axial direction of said second worm shaft.

13. The spring return valve actuator according to the claim 1, an over torque switching unit is provided on said second worm shaft to prevent an over torque movement along the axial direction of said second worm shaft.

14. The spring return valve actuator according to the claim 13, said over torque switching unit comprises:
- a torque shaft rotatably connected on said second worm shaft almost vertically by a torque pin; and
- a rotation detecting sensor installed on said torque shaft to detect the rotation of the same.

* * * * *

UNITED STATES PATENT AND TRADEMARK OFFICE
CERTIFICATE OF CORRECTION

PATENT NO. : 8,360,393 B2
APPLICATION NO. : 12/440403
DATED : January 29, 2013
INVENTOR(S) : Soon-won Park Page 1 of 1

It is certified that error appears in the above-identified patent and that said Letters Patent is hereby corrected as shown below:

In the Claims

In column 8, claim 2, line 9, after "said motor can" replace "rotates" with --rotate--.

In column 8, claim 4, line 22, before "rotating and" replace "a sun first gear" with --a first sun gear--.

In column 8, claim 10, line 60, after "spring return valve" insert --actuator--.

Signed and Sealed this
Twenty-eighth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO.       : 8,360,393 B2                                       Page 1 of 1
APPLICATION NO.  : 12/440403
DATED            : January 29, 2013
INVENTOR(S)      : Soon-won Park It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 971 days.

Signed and Sealed this

First Day of September, 2015

Michelle K. Lee
*Director of the United States Patent and Trademark Office*